United States Patent [19]

Martin et al.

[11] Patent Number: 4,955,562

[45] Date of Patent: Sep. 11, 1990

[54] MICROWAVE POWERED AIRCRAFT

[75] Inventors: John E. Martin, Ottawa; James D. DeLaurier, Concord; George W. Jull; Arne Lillemark, both of Nepean, all of Canada

[73] Assignee: Her Majesty the Queen in right of Canada, as represented by the Minister of Communications, Ottawa, Canada

[21] Appl. No.: 272,015

[22] Filed: Nov. 16, 1988

[30] Foreign Application Priority Data

Nov. 24, 1987 [CA] Canada ................................ 552664

[51] Int. Cl.$^5$ .............................................. B64C 39/02
[52] U.S. Cl. ..................................... 244/62; 244/1 R; 343/705; 343/708
[58] Field of Search ............ 244/62, 1 R, 45 R, 45 A, 244/87, 91; 343/705, 708

[56] References Cited

U.S. PATENT DOCUMENTS

| | | | |
|---|---|---|---|
| 3,358,946 | 12/1967 | Shye | 244/45 R |
| 3,434,678 | 3/1969 | Brown et al. | 244/158 R |
| 3,656,164 | 4/1972 | Rempt | 343/705 |
| 4,593,288 | 6/1986 | Fitzpatrick | 244/118.1 |
| 4,635,067 | 1/1987 | Fitzpatrick | 343/705 |
| 4,662,588 | 5/1987 | Henderson | 244/118.2 |

*Primary Examiner*—Joseph F. Peters, Jr.
*Assistant Examiner*—Anne Sartelle
*Attorney, Agent, or Firm*—Nixon & Vanderhye

[57] ABSTRACT

A microwave-powered aircraft has lifting surfaces for exerting lifting forces on the aircraft in response to the propulsion of the aircraft and a rectenna array for receiving and rectifying microwave energy transmitted to the aircraft from a location remote from the aircraft. An electric motor for driving a propeller is energized by microwave energy received by the rectenna array, which is provided in a body at the underside of the aircraft. The body has its major dimensions extending horizontally and is relatively shallow with a periphery which is vertically curved so as to reduce turbulence in the airstream over the body during flight. The body is separate from the lifting surfaces and shaped to at least substantially avoid the generation of lifting forces by the body.

16 Claims, 2 Drawing Sheets

MICROWAVE POWERED AIRCRAFT

FIELD OF THE INVENTION

The present invention relates to a microwave-powered aircraft and, more particularly, to a high altitude electrically-powered aircraft to which power is supplied in the form of microwaves, which are transmitted from a ground station, and which are rectified on the aircraft to provide a source of electrical power for the propulsion and on-board systems of the aircraft.

DESCRIPTION OF RELATED ART

It is already known, from the prior art, how to provide a microwave power collecting and conversion device, which is known as a "rectenna" (rectifying antenna) mounted on the lower surfaces of such an aircraft for receiving and rectifying microwave energy, the rectenna being provided in the form of an array of discrete components comprising half wavelength dipole antennas, each terminated in a rectifying diode, or in the form of one or more thin film printed circuits, which intercept the fraction of the power of a microwave beam which falls upon the surface of the rectenna. This microwave power is converted by the rectenna into direct current power, which is used to drive one or more electrical propulsion motors, for rotating one or more propellers, and to power a payload carried by the aircraft.

It has been suggested that such aircraft could be platforms for payloads employed, for example, for telecommunications signal relaying, TV broadcasting, remote sensing and conducting of surveillance and atmospheric environmental probing missions. For such missions, it is often desirable to confine the aircraft flight path to a constrained station-keeping volume above the ground station.

More particularly, in U.S. Pat. No. 3,144,517 there is disclosed a microwave-powered space vehicle which utilizes a heat exchanger method for electromagnetic energy conversion.

U.S. Pat. No. 3,434,678 discloses a combined antenna and conversion mechanism, i.e. a rectenna, for powering space vehicles, and discloses the use of such a mechanism for propulsion by incorporation of the rectenna in a small flying model helicopter.

In "High Altitude Powered Platform Cost and Feasibility Study", J. W. Sinko, SRI Project 5655-502, prepared for NASA under Contract NASW-2962, Oct. 1977, there is proposed a neutrally-buoyant dirigible lighter-than-air vehicle and a microwave-powered aircraft, both of which obtain propulsive power from a microwave beam through use of rectennae.

In "Design Definition of a Microwave Power Reception and Conversion System for use on a High Altitude Powered Platform" NASA/CR/156866, W. C. Brown, Raytheon, prepared for NASA under Contract NAS-6-3006, 1981, and "Design Study for a Ground Microwave Power Transmission System for use with a High Altitude Powered Platform", W. C. Brown, Raytheon, prepared for NASA under contract NAS-6-3200, May 1982, there are described microwave-power transmission and reception systems suitable for application in neutrally-buoyant air ships, employed as high altitude platforms, and "Design Study for Remotely-Piloted, High Altitude Airplanes Powered by Microwave Energy", C. E. K. Morris Jr., AIAA Applied Aeodynamics Conference, July 13-15, 1983, Danvers, Mass., and "Parametric Study of Microwave-Powered High-Altitude Airplane Platforms Designed for Linear Flight", C. E. K. Morris Jr., NASA Technical Paper 1918, Nov. 1981, disclose analytical research into the subject of microwave powered aircraft where the power is collected at the lower surfaces of the wings of the aircraft. "Research on the Technology of an Airplane Concept for a Stationary High-Altitude Relay Platform (SHARP)", J. Delaurier, B. Gagnon, J. Wong, R. Williams and C. Hayball, presented at the Thirty-Second Annual General Meeting of the Canadian Aeronautics and Space Institute, Montreal, May 27, 1985, describes microwave-powered aircraft research in which power is collected at the lower surfaces of monoplane and biplane airplane wings.

Economic analyses have shown that the ten year life cycle costs of a ground transmission system can exceed those associated with its high altitude airplane platform, constructed according to prior art, by factors of four or more. Therefore, increases in the cost and complexity of the aerial vehicle are fully justified provided that they result in a reduction in costs of the ground transmission system. Cost reductions would be achieved by reduction of transmitted power level and/or by a reduction of the beam steering range. This latter reduction would be achieved through reduction in the horizontal extent of the station keeping volume.

It is known that life cycle costs associated with a ground transmission system are proportional to the square root of the transmitted power level. They are also inversely proportional to the required beam cross-sectional diameter at the operating flight altitude, because, by well-known laws of microwave optics, a smaller focussed beam cross-section at altitude requires a larger aperture antenna on the ground, the costs of which are proportional to the aperture area.

The fraction of total transmitted power which can be intercepted on the lower surfaces of wings of microwave-powered aircraft can be shown to be very low indeed, for practical configurations of aircraft and power beam cross-sectional areas. For example, a focussed power beam cross-sectional shape is generally approximately circular, with a diameter of some tens of meters at an altitude of 20 km. On the other hand, the wing span of practical sizes of microwave-powered aircraft can be up to several tens of meters, with wing chords of only a few meters. As a consequence, the efficiency of transferring microwave power from ground to aircraft can be somewhat less than ten per cent in such practical cases. Hence, the transmitted power levels, and resulting power flux density levels required for flight at the operating altitude, must be increased to compensate for such low power transfer efficiency.

In addition, optimum tradeoffs between power beam steering angles and aircraft banking angles are important in increasing efficiency in microwave power transfer from ground to aircraft. These tradeoffs also impact effectiveness to carry out many types of missions. Analysis shows that aircraft configured according to the prior art either require a wide horizontal extent to the station-keeping volume and hence large beam steering angles or, alternately, must bank over large angles to execute required flight patterns within a station keeping volume of narrow horizontal extent. It is known that system costs increase for flight over a wide horizontal range because of the consequently additional wide angular steering demands placed on the power beam steering systems. For example, it has been calculated that life cycle costs of one type of ground transmission system would increase by a factor of two if the angular beam steering range were increased from ±3° to ±6°, corresponding to a horizontal diameter of the flight pattern increasing from two km to four km at an altitude of 20 km.

SUMMARY OF THE INVENTION

It is accordingly an object of the present invention to reduce the cost and to increase the mission payload capability of a microwave-powered aircraft system as compared with prior art systems.

The present invention provides a microwave-powered aircraft comprising means for propelling the aircraft, means defining lifting surfaces on the aircraft for exerting lifting forces on the aircraft in response to the propulsion of the aircraft, means for receiving and rectifying microwave energy transmitted to the aircraft from a location remote from the aircraft, the means for propelling the aircraft being operable in response to the microwave energy received by the microwave energy receiving and rectifying means, and the microwave energy receiving and rectifying means comprising a body at the underside of the aircraft, the body having its major dimensions extending horizontally and being relatively shallow with a periphery which is vertically curved so as to reduce turbulence in the airstream over the body during flight, and the body being separate from the lifting means and shaped to at least substantially avoid the generation of lifting forces by the body, and a plurality of downwardly-facing microwave antennas and associated rectifying elements at the underside of the body.

More particularly, the body may be of lenticular shape and substantially elliptical cross-sectional shape, in planes parallel to and transverse to the longitudinal axis of the aircraft, and of substantially circular plan shape.

The means defining the lifting surfaces preferably comprise wings located forwardly of the lenticular body, which may in that case serve as means for promoting longitudinal stability of the aircraft.

A microwave energy reflector may be provided within the lenticular body, above the microwave antennas, for shielding a space located above the microwave reflector within the lenticular body from microwave radiation.

The aircraft preferably includes a fuselage with a movable canard located forwardly of the lifting surfaces, or conventional tail surfaces of the fuselage, for promoting longitudinal stability of the aircraft, and a pylon of symmetrical aerofoil cross-section is preferably mounted on the fuselage to support the wings, the pylon including a flap at a trailing edge of the pylon for causing a side force to act on the aircraft independently of the angle of bank of the aircraft. The control of such a surface in conjunction with the other control surfaces of an aircraft, can produce turns with relative small banking angles.

BRIEF DESCRIPTION OF THE DRAWINGS

The invention will be more readily understood from the following description of preferred embodiments thereof given, by way of example, with reference to the accompanying diagrammatic drawings, in which.

DESCRIPTION OF PREFERRED EMBODIMENTS

Figure 1:
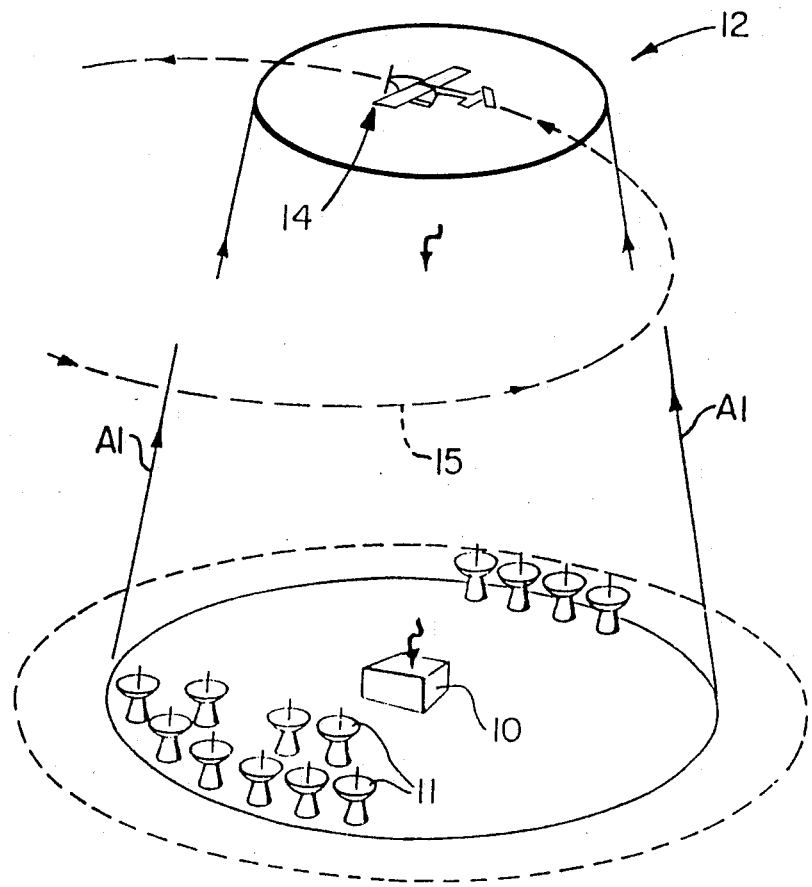
FIG. 1 shows a view in perspective of a microwave-powered aircraft system, including a ground station and an aircraft powered from the ground station.

Referring now to FIG. 1 of the accompanying drawings, there is shown in this figure a microwave-powered aircraft system of the type in which the present invention may be embodied. This system has, on the ground, a control center 10 associated with an array of microwave transmission antennas 11, for transmitting upwardly a power beam, indicated by arrows A1, into a power spot, indicated generally by reference numeral 12, at the height of an aircraft, indicated generally by reference numeral 14, which is to be powered by the microwaves.

The aircraft 14 is shown flying around a circular flight pattern 15 and this circular flight pattern, or other appropriate closed flight pattern may, for example, be at a height of 20 km above ground level, the power spot 12 having a diameter of approximately 30 meters, a circular flight pattern 15 having e.g. a diameter of up to approximately 4 km and the microwave energy being transmitted from an array of antennas within a circular area, of approximately 70 meters diameter.

Thus, the antennas 11 direct and focus a high-powered microwave beam onto the aircraft 14, which is powered by the microwave energy received by a rectenna (not shown) provided on the aircraft 14. In this way, the aircraft is propelled around its flight path or circular course 15, which diagrammatically represents the perimeter of the area of movement of the aircraft 14, and which, as indicated above, has a diameter of 4 km, which corresponds to a beam steering range of approximately ±6° at the altitude of 20 km.

Figure 2:
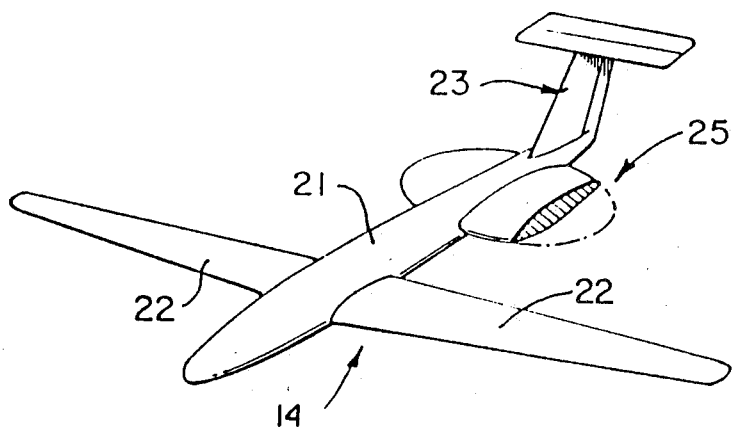
FIGS. 2 and 3 show views in perspective of an aircraft embodying the present invention.

Referring now to FIG. 2 of the drawings, there are shown parts of an aircraft indicated generally by reference numeral 20, which has a fuselage 21, a pair of wings 22 and a conventional aircraft tail assembly indicated generally by reference numeral 23, the means for propelling this aircraft being omitted to facilitate illustration.

To the rear of the aircraft wings 22, the fuselage 21 is provided with a lenticular body indicated generally by reference numeral 25, which has at its underside a downwardly facing rectenna (not shown).

In order to minimize the required microwave beam power flux density by providing a large area for accommodating the rectenna, but without necessarily contributing to the lift forces exerted on the aircraft 14 by the airflow past the aircraft 14, the lenticular body 25 is shaped and oriented so as to avoid the generation of aerodynamic lift and, thus, to counteract the generation of lift-induced drag by the lenticular body 25, which would otherwise increase the power required for propelling the aircraft.

This is in contrast with prior art aircraft, in which the provision of an adequate rectenna area on the lower wing surface conflicts with the necessity for high wing aspect ratio for reducing the required flight power.

Thus, to enable the rectenna area to be made large, the lenticular body 25 is designed to avoid the creation of lift and drag forces by the lenticular body and, for that purpose, is made elliptical in cross-section parallel to the longitudinal axis of the aircraft, i.e. in the streamwise direction, and has no sharp trailing edge, so as to avoid the generation of lifting forces.

As will be appreciated by those skilled in the art, in a real, viscous fluid such as air, there will in practice be some lifting forces generated by the lenticular body 25. However, the effect of such forces is minimized by the choice of a low aspect ratio for the lenticular body, and by the adoption of a circular planform for the lenticular body 25, which provides a lift-inefficient surface.

By thus separating the lifting surface area, i.e. the wings, from the lenticular body 25 of the rectenna, the wings 22 may be designed with an aerodynamically efficient high aspect ratio, thus producing a beneficial reduction in the power required for flight of the aircraft without necessitating an increase in the required power flux density in the microwave beam utilized to transmit that power to the aircraft.

The lenticular body 25 is formed by a skin of stretchable plastic material stretched over a framework (not shown) and coated with PTFE to protect the skin against the atmospheric environment, and particularly against atmospheric ozone.

Figure 5:
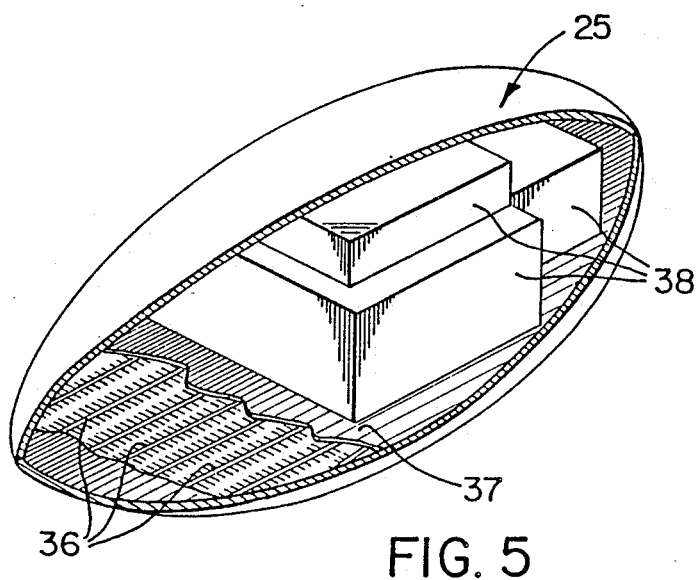
FIG. 5 shows a broken-away view in perspective of a lenticular body forming part of the aircraft of FIGS. 2 to 4.

In the embodiment of the lenticular body illustrated in FIG. 5, the volume within the lenticular body 25 above the rectenna 36 is effectively shielded from the microwave power beam by a reflector surface 37, associated with the rectenna itself. This volume is therefore available for the installation of power conditioning, controls and payload components 38, many of which should desirably or even necessarily be isolated from the microwave power beam.

While the lift coefficient, and therefore the induced drag, of the lenticular body 25 is small, this body nevertheless presents a sufficiently large area, which is determined by the requirements for the rectenna, that the body can produce a sufficient force allowing it to act as a stabilizing horizontal tail, the lenticular body 25 being located, in the embodiment illustrated in FIG. 2, aft of the main lifting surface provided by the wings 22.

In this connection it will be appreciated that since the microwave-powered aircraft is intended for operation at high altitudes, it does not posses a high degree of natural longitudinal stability and, therefore, artificial augmentation of such stability is desirable. To this end, the control of the pitch of the aircraft may be effected by a separate control surface, either in the form of a conventional tail plane and elevator, as indicated by reference numeral 23 in FIG. 2, by an all-moving tail plane or, alternatively, and in order to minimize aerodynamic resistance, by a forward control surface or canard, as indicated generally by reference numeral 27 in FIG. 3. The size of the canard is selected so as to provide appropriate pitching moments to trim the aircraft throughout the operational speed range of the aircraft in response to steering control signals and to provide pitch damping moments in response to the signals from a pitch stability augmentation system (not shown).

In order to produce a lateral force acting upon the aircraft independently of the banking angle of the aircraft, so that the required banking angle can be minimized, a vertical aerofoil surface is provided in the neighbourhood of the location of a longitudinal center of gravity of the aircraft.

Figure 4:
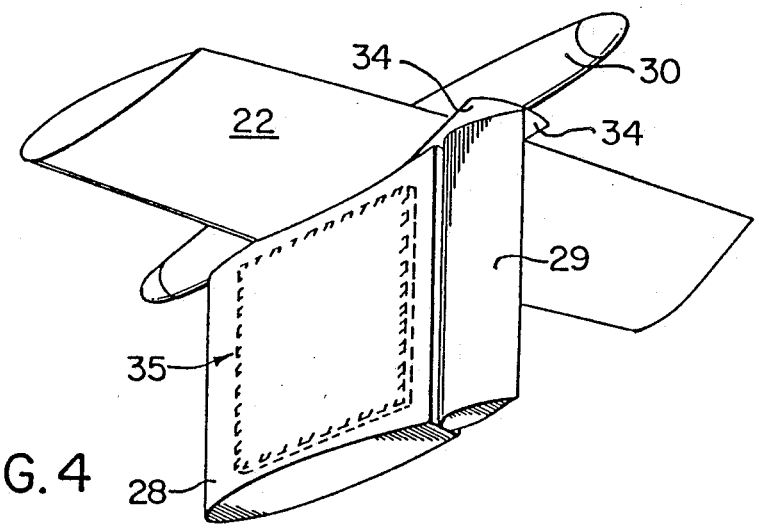
FIG. 4 shows a view in perspective of parts of the aircraft of FIG. 3.

This aerofoil surface is provided by a pylon 28, of horizontal symmetrical aerofoil cross-section, which is provided with a flap 29. The pylon 28 is located between the fuselage 21 of the aircraft and a motor housing or nacelle 30, containing electric motors (not shown) which are energized by direct current provided from the rectenna for driving propellers 31 at opposite ends of the nacelle 30. This arrangement minimizes aerodynamic interference between the canard 27, the wings 22 and the lenticular body 25. Also, the location of the propellers 31 at opposite ends of the nacelle 30 on the pylon 28 serves to provide protection for the propellers 31 from damage during launching and recovery of the aircraft. As shown in FIG. 4, end plate fairings 34, which extend over the extent of travel of the flap 29, are provided in order to maximize the efficiency of the flap 29 by counteracting the creation of turbulence at the ends of the flap 29.

Since, as indicated above, the wings 22 are designed with a large wing aspect ratio in order to enhance the aerodynamic efficiency of the aircraft, and since a large aspect ratio wing can result in some degree of spiral instability, it may be necessary to ensure lateral-directional stability by artificial means. Consequently, the effect of the pylon 28, acting as a forward fin, is not in itself a design criterion and, consequently, the dimensions of the pylon 28 may be selected sufficiently large to accommodate relatively large sideways-facing mission payload sensors, e.g. radar antennas, indicated generally by reference numeral 35 in FIG. 4.

Figure 3:
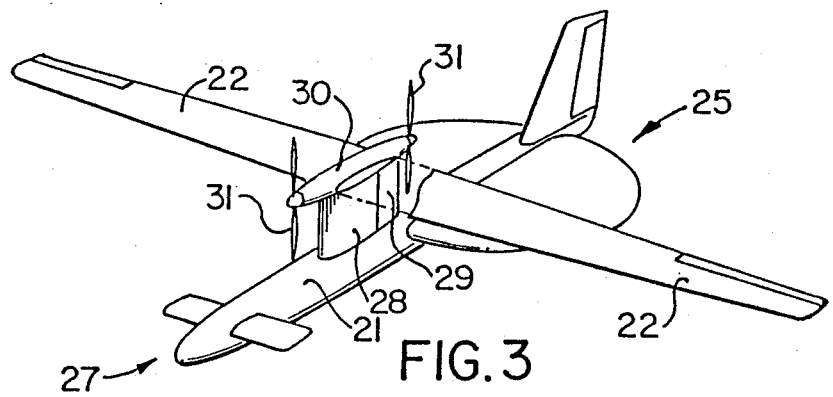

While, as indicated above, no propulsion means have been shown in FIG. 2, it is to be understood that the aircraft shown in FIG. 2 is to be provided with a pylon 28, a trailing edge flap 29, a nacelle 30, propellers 31 and one or more electrical propulsion motors as in the embodiment of FIG. 3.

Various modifications may be made in the above-described aircraft for example, the rectenna may include microwave antennas and associated rectifying elements provided at the underside of the aircrafts wings, in addition to those provided at the lenticular body. Also, the invention is not restricted to fixed wing aircraft but may be utilized in rotary wing aircraft.

We claim:

1. A microwave-powered aircraft, comprising:
    means for propelling the aircraft;
    means defining lifting surfaces on the aircraft for exerting lifting forces on the aircraft in response to the propulsion of the aircraft;
    means for receiving and rectifying microwave energy transmitted to the aircraft from a location remote from the aircraft;
    the means for propelling the aircraft being operable in response to the microwave energy received by the microwave energy receiving and rectifying means; and
    the microwave energy receiving and rectifying means comprising a rigid body of substantially circular plan form attached to the aircraft, the horizontal dimensions of the body being a substantial fraction of the aircraft wingspan and the body being relatively shallow with a periphery which is vertically curved so as to reduce turbulence in the airstream over the body during flight, and the body being separate from the lifting means and shaped to at least substantially avoid the generation of lifting forces by the body;

a plurality of downwardly-facing microwave antennas and associated rectifying elements at the underside of the body; and microwave reflector means provided in the body above said microwave antenna for shielding a space located above said microwave reflector means and within the body from microwave radiation.

2. A microwave-powered aircraft as claimed in claim 1, wherein the body is of substantially elliptical vertical cross-sectional shape in planes parallel to the longitudinal axis of the aircraft.

3. A microwave-powered aircraft as claimed in claim 1, wherein the means defining lifting surfaces comprise wings located forwardly of the body, which serves as means for promoting longitudinal stability of the aircraft.

4. A microwave-powered aircraft as claimed in claim 1 or 2, wherein the aircraft includes a fuselage and a canard provided on the fuselage at a location disposed forwardly of the lifting surfaces for promoting longitudinal stability and control of the aircraft.

5. A microwave-powered aircraft as claimed in claim 1, wherein the aircraft includes a fuselage, the lifting surface defining means comprising a pair of wings, and a pylon of aerofoil cross-section is mounted on the fuselage and supports the wings.

6. A microwave-powered aircraft as claimed in claim 5, wherein the aerofoil cross-section of the pylon is symmetrical.

7. The microwave-powered aircraft as claimed in claim 5, wherein the pylon includes a flap at a trailing edge of the pylon for causing a side force to act on the aircraft independently of the angle of bank of the aircraft.

8. A microwave-powered aircraft as claimed in claim 7, further including end plate fairing means extending over the extent of travel of the flap for improving the efficiency of the flap.

9. A microwave-powered aircraft as claimed in claim 5, 6 or 7, wherein the means for propelling the aircraft include at least one propeller and electric motor means associated with the propeller for driving the propeller, the electric motor means being provided at the intersection of the pylon and the wings to protect the propeller.

10. A microwave-powered aircraft as claimed in claim 5, 6 or 7, wherein the wings comprise a pair of high aspect ratio wings, and side-facing sensors are provided on the pylon.

11. A microwave-powered aircraft as claimed in claim 1 or 2, wherein the lifting surface defining means comprise a pair of high aspect ratio wings.

12. The microwave-powered aircraft claimed in claim 1, further comprising:

means for laterally deflecting the course of travel of the aircraft without causing any substantial banking of the aircraft, wherein the said laterally deflecting means comprises a vertically extending member having a horizontal cross-section of aerofoil shape and an adjustable flap extending along a vertically trailing edge of the deflecting member.

13. A microwave-powered aircraft as claimed in claim 12, further comprising a fuselage, the lifting surface defining means comprising a pair of fixed wings and the vertically extending member supporting the wings above the fuselage.

14. A microwave-powered aircraft as claimed in claim 12, wherein the laterally deflecting means are located at least approximately above the centre of gravity of the aircraft.

15. A microwave-powered aircraft as claimed in claim 13, wherein the means for propelling the aircraft comprise at least one propeller and electric motor means mounted above the vertically extending member for rotating the propeller.

16. A microwave-powered aircraft as claimed in claim 14, further comprising a canard provided forwardly of the lifting surfaces for promoting longitudinal stability and control of the aircraft.

* * * * *